(12) United States Patent
Dirnberger et al.

(10) Patent No.: US 11,752,463 B2
(45) Date of Patent: Sep. 12, 2023

(54) ADSORBER ELEMENT FOR A FILTER SYSTEM AND FILTER SYSTEM WITH AN ADSORBER ELEMENT

(71) Applicant: MANN+HUMMEL GmbH, Ludwigsburg (DE)

(72) Inventors: Timo Dirnberger, Marbach (DE); Bernd Joos, Lorch (DE); Christopher Listl, Leonberg (DE); Mathias Hoesl, Marklkofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 211 days.

(21) Appl. No.: 17/117,771

(22) Filed: Dec. 10, 2020

(65) Prior Publication Data

US 2021/0178305 A1    Jun. 17, 2021

(30) Foreign Application Priority Data

Dec. 12, 2019  (DE) .......................... 102019134186.8

(51) Int. Cl.
*B01D 46/00* (2022.01)
*B01D 53/04* (2006.01)
*B01D 46/10* (2006.01)

(52) U.S. Cl.
CPC ......... *B01D 46/0036* (2013.01); *B01D 46/10* (2013.01); *B01D 53/0407* (2013.01); *B01D 2253/102* (2013.01); *B01D 2257/702* (2013.01); *B01D 2279/60* (2013.01)

(58) Field of Classification Search
CPC .................................................. F02M 25/0854
USPC ............ 96/134, 135, 138, 147, 154; 95/146; 55/385.3
See application file for complete search history.

(56) References Cited

U.S. PATENT DOCUMENTS

| 2006/0107836 A1* | 5/2006 | Maier ................ B01D 46/2411 96/134 |
| 2015/0075126 A1* | 3/2015 | Schmid ............ F02M 35/02416 55/495 |
| 2019/0168148 A1* | 6/2019 | Dirnberger .............. E05B 65/00 |

FOREIGN PATENT DOCUMENTS

DE          202018102943 U1     6/2018

* cited by examiner

*Primary Examiner* — John Kwon

(57) ABSTRACT

An adsorber element for a filter system is provided with a frame that has a base plate and one or more rigid support elements that project away from the base plate. An adsorber medium is disposed at the frame and arranged at least in sections of the base plate and at least in sections of the one or more rigid support elements. The filter system has a housing with an inlet and an outlet. The filter system is flowed through by a gaseous fluid from the inlet to the outlet. A filter element is arranged in the housing between inlet and outlet. The adsorber element is arranged in the housing preferably downstream of the filter element.

15 Claims, 5 Drawing Sheets

ADSORBER ELEMENT FOR A FILTER SYSTEM AND FILTER SYSTEM WITH AN ADSORBER ELEMENT

BACKGROUND OF THE INVENTION

The invention concerns an adsorber element for a filter system, in particular an air filter system, as well as a filter system with an adsorber element.

DE 10 2013 013 390 A1 discloses a filter system with an adsorber element. The adsorber element is movably supported so that the effective flow cross section for the fluid is changeable by a position change of the adsorber element.

SUMMARY OF THE INVENTION

The invention has the object to provide an adsorber element for a filter system with improved efficiency.

A further object is providing a filter system with improved adsorber properties.

The aforementioned object is solved according to one aspect of the invention by an adsorber element with at least one adsorber medium for a filter system, wherein the filter system comprises a housing with an inlet and an outlet and the filter system can be flowed through by a gaseous fluid from the inlet to the outlet. A frame is provided comprising a base plate and one or a plurality of rigid support elements projecting away from the base plate, wherein the base plate and the support elements comprise at least in sections thereof the adsorber medium.

The further object is solved by a filter system comprising a housing with an inlet and an outlet and a filter element arranged between inlet and outlet, wherein the filter system can be flowed through by a gaseous fluid flowing from the inlet to the outlet, and further comprising at least one adsorber element according to the invention.

Beneficial configurations and advantages of the invention result from the further claims, the description, and the drawing.

An adsorber element is proposed with at least one adsorber medium for a filter system, wherein the filter system comprises a housing with an inlet and an outlet and the filter system can be flowed through by a gaseous fluid from the inlet to the outlet. A frame comprising a base plate and one or a plurality of rigid support elements projecting away from the base plate is provided, wherein the base plate and the support elements at least in sections thereof comprise the adsorber medium.

Advantageously, the adsorber element can be used as an HC trap in a clean air flow, in particular in a motor vehicle, in which back-diffusing hydrocarbons (HC) are to be adsorbed from the clean air when the internal combustion engine is turned off.

A large surface of the adsorber medium is available because the base plate as well as the sail-shaped support elements can be covered with adsorber medium. Moreover, the free-standing sails provide the possibility that both sides of the adsorber medium come into contact with the fluid. This provides for an increased adsorption performance and desorption performance of the adsorption element.

Since the support elements are rigidly embodied, the fluid flow at the adsorber element is only affected to a small extent, in particular, the adsorber element causes no significant increase of the pressure loss. Due to the rigid arrangement of the support elements, the flow of the fluid does not change in an unpredictable manner so that measured values of an air-mass meter, for example, a hot-film air mass meter, in the fluid flow are not falsified.

The frame with base plate and support elements can be produced by injection molding, 3D printing or the like. The configuration provides for good mold removal of the frame of the adsorber element.

According to a beneficial configuration of the adsorber element, the base plate can comprise openings, in particular the base plate can be designed in a grid shape. Advantageously, the adsorber medium, for example, an adsorber mat, can be accessible for the fluid flow through the permeable base plate. The base plate can serve as a carrier for the adsorber medium.

According to a beneficial configuration of the adsorber element, the adsorber medium arranged on the base plate can be arranged on a side of the base plate which is oppositely positioned to the support elements. This can be the backside of the base plate. In this way, fluid can reach the adsorber medium. The base plate can advantageously be formed by two parts, a top plate and a bottom plate, which enclose the adsorber medium. The support elements project away from the base plate when the latter is of a single plate design or from one of the two plates when the latter is embodied of two plates. The second plate can also have openings so that the fluid can reach the adsorber medium from this side also. In this way, a simple mounting of the adsorber medium can be realized. The latter can be embodied beneficially as a mat or the like.

According to a beneficial configuration of the adsorber element, at least one support element can support the adsorber medium of the support element at least at one side. The adsorber medium can be held stably at the support element.

According to a beneficial configuration of the adsorber element, at least one of the support elements can comprise a pocket for holding the adsorber medium. The adsorber medium, for example, as a mat, can be pushed simply into the pocket.

According to a beneficial configuration of the adsorber element, the base plate on its side oppositely positioned to the support elements can be covered with a fluid-tight cover. In this way, the adsorber medium on the base plate can be protected. In particular, this enables a transportation capability of the adsorber element.

According to a beneficial configuration of the adsorber element, the adsorber medium can comprise at least one activated carbon-containing layer, comprising a gas-permeable carrier layer on which an activated carbon layer is arranged. The activated carbon layer can be formed by a fluid-permeable adhesive layer on which activated carbon particles are applied. Advantageously, the adsorber medium can be formed by a plurality of such layers. The number of layers can be selected according to need.

According to a beneficial configuration of the adsorber element, the activated carbon layer can be covered by a gas-permeable holding layer. In this way, the activated carbon layer can be fixed securely on the carrier layer and form a self-supporting activated carbon-containing layer.

According to a beneficial configuration of the adsorber element, support elements and base plate with adsorber medium arranged thereat can be sealed at their rims. In this way, it can be permanently prevented that activated carbon particles or other particles become detached from the adsorber medium and reach the clean air flow.

According to a further aspect of the invention, a filter system is proposed comprising a housing with an inlet and an outlet and a filter element arranged between inlet and outlet, wherein the filter system can be flowed through by a gaseous fluid flowing from the inlet to the outlet, and further comprising at least one adsorber element according to the invention.

The adsorber element comprises a frame, comprising a base plate and one or a plurality of rigid support elements projecting away from the base plate, wherein the base plate and the support elements comprise at least in sections thereof the adsorber medium.

Advantageously, the support elements can be oriented in the direction toward a clean air socket, i.e., they produce no significant pressure loss and do not impair the flow guiding action and the signal of a possibly present air-mass meter.

Beneficially, the base plate can be combined of two parts between which the adsorber medium of the base plate is enclosed.

According to a beneficial embodiment of the filter system, the base plate of the adsorber element can be arranged substantially parallel to a region of an outer wall of the housing. The adsorber element can be mounted beneficially, for example, in a clean air hood of a clean air supply of an internal combustion engine. Alternatively, the base plate can also be arranged differently, for example, at a slant to the outer wall.

According to a beneficial embodiment of the filter system, the base plate can be arranged at a distance from the region of the outer wall. For example, one or a plurality of spacers can be arranged therebetween. Beneficially, adsorber medium can be arranged on the side of the base plate facing away from the support elements which has openings for this purpose. Due to the distance of the base plate from the region of the outer wall, fluid can reach also the backside of the base plate whereby the adsorber surface of the base plate is practically doubled.

According to a beneficial configuration of the filter system, the support elements with their adsorber medium can be arranged substantially parallel to the main flow direction between an outflow side of the filter element and the outlet of the housing. Advantageously, the rigid support elements produce no noteworthy pressure loss and do not impair the flow guiding action and the signal of a possibly present air-mass meter. Also beneficial is a sail-type shape of the support elements.

According to a beneficial configuration of the filter system, the adsorber element can be arranged downstream of the filter element between an inlet-side raw side and an outlet-side clean side. In this context, a pressure loss of the filter element is substantially determined only by the filter element.

According to a beneficial configuration of the filter system, the adsorber element can be arranged in a clean air region, for example, in a clean air hood. Beneficially, an operation of an air-mass meter can remain unaffected due to the only minimal pressure loss of the adsorber element.

BRIEF DESCRIPTION OF THE DRAWINGS

Further advantages result from the following drawing description. Embodiments of the invention are illustrated in the drawings. The drawings, the description, and the claims contain numerous features in combination. A person of skill in the art will consider the features expediently also individually and combine them to expedient further combinations.

DESCRIPTION OF PREFERRED EMBODIMENTS

Figure 1:
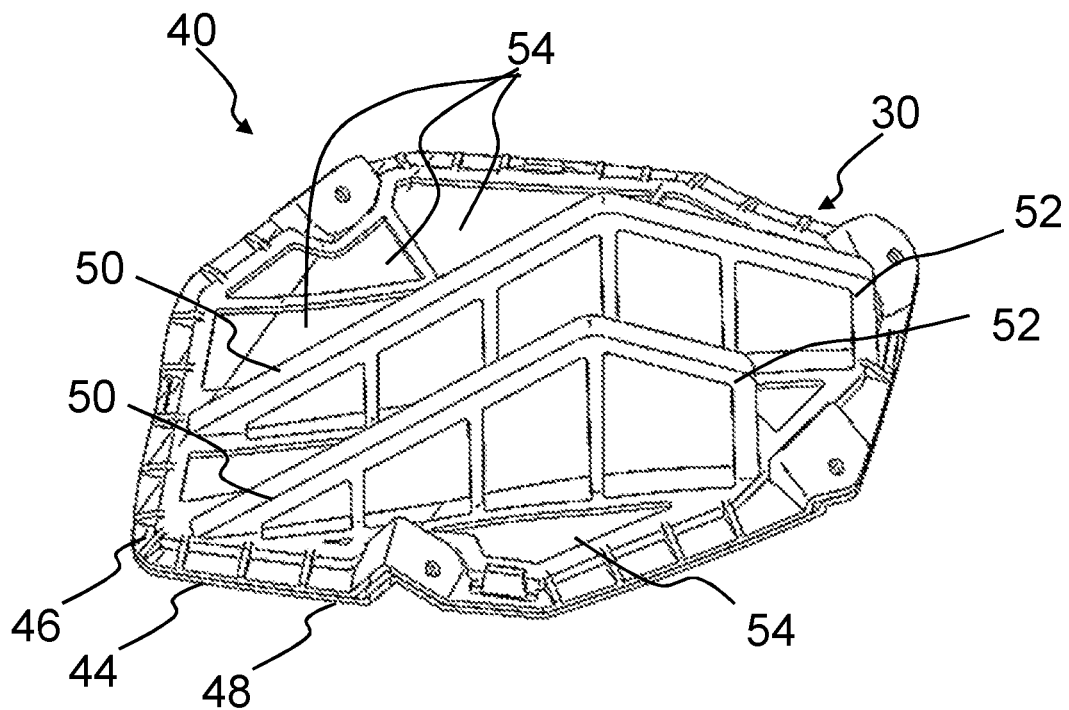
FIG. 1 shows a perspective view of an adsorber element according to an embodiment of the invention.

In the Figures, same or similar components are identified with same reference characters.

FIGS. 1 through 4 show various views of an adsorber element 40 according to an embodiment of the invention. The adsorber element 40 is in particular suitable for a filter system with a gaseous fluid flow, in particular for an air filter system, in which hydrocarbons are to be removed at the clean side of the filter system. The adsorber medium 42 adsorbs this foreign matter at the clean gas side.

Figure 2:
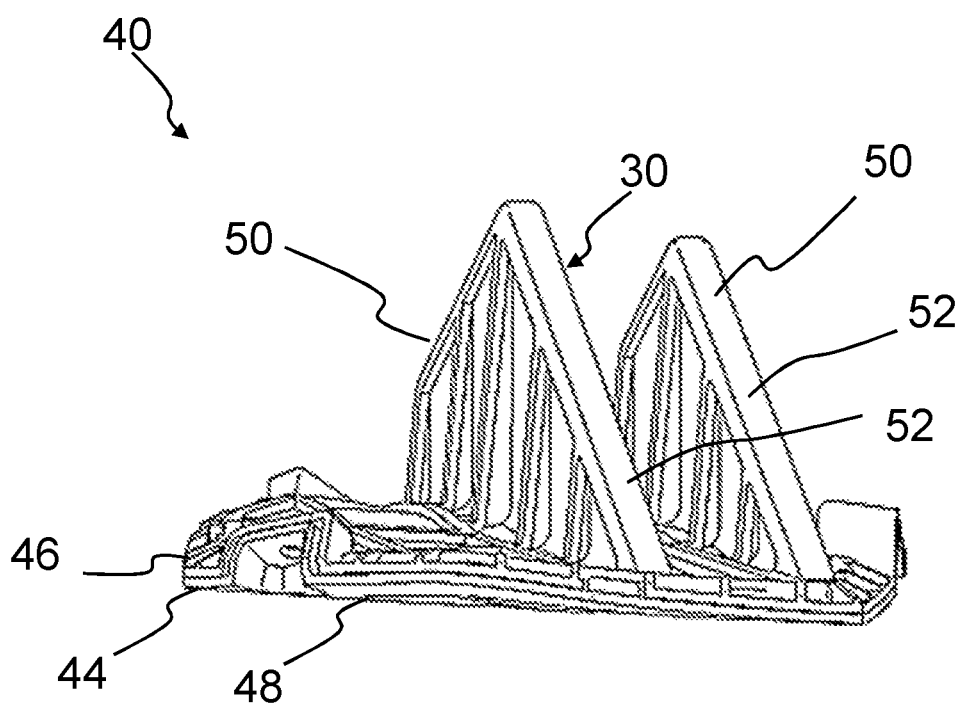
FIG. 2 shows a side view of the adsorber element according to FIG. 1.
Figure 3:
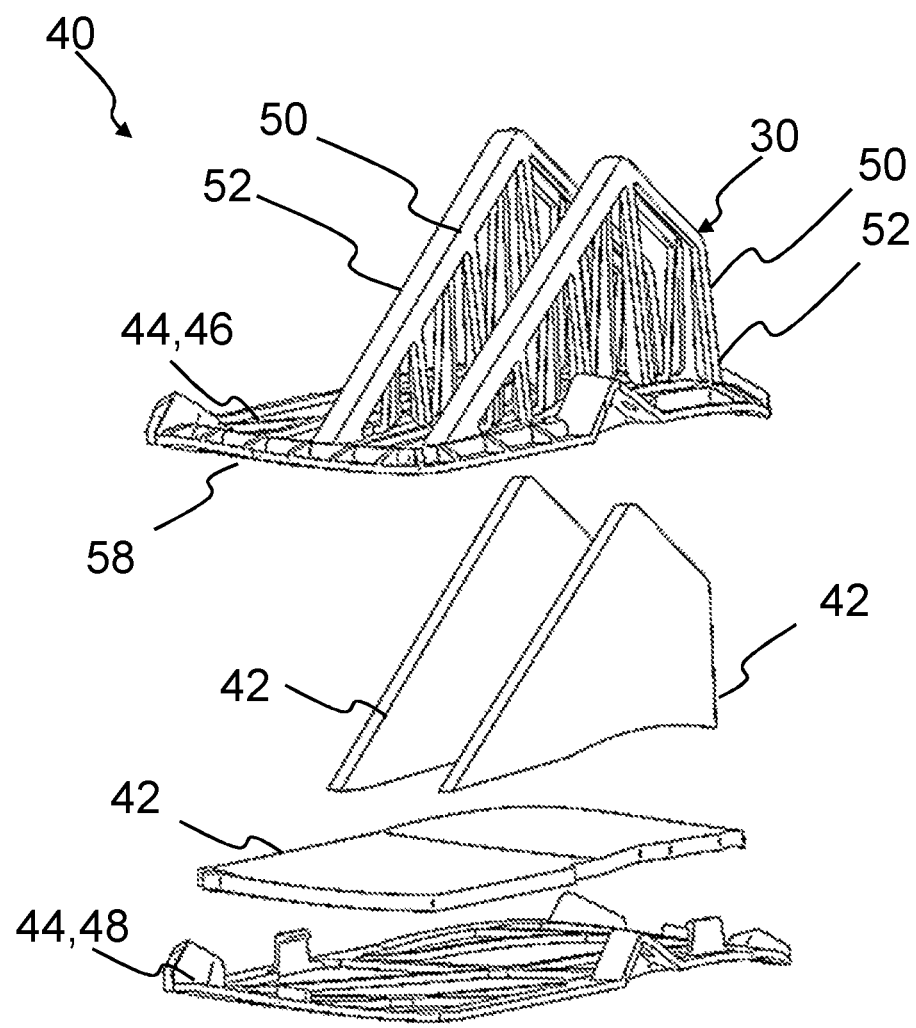
FIG. 3 shows in exploded illustration components of the adsorber element according to FIG. 1.
Figure 4:
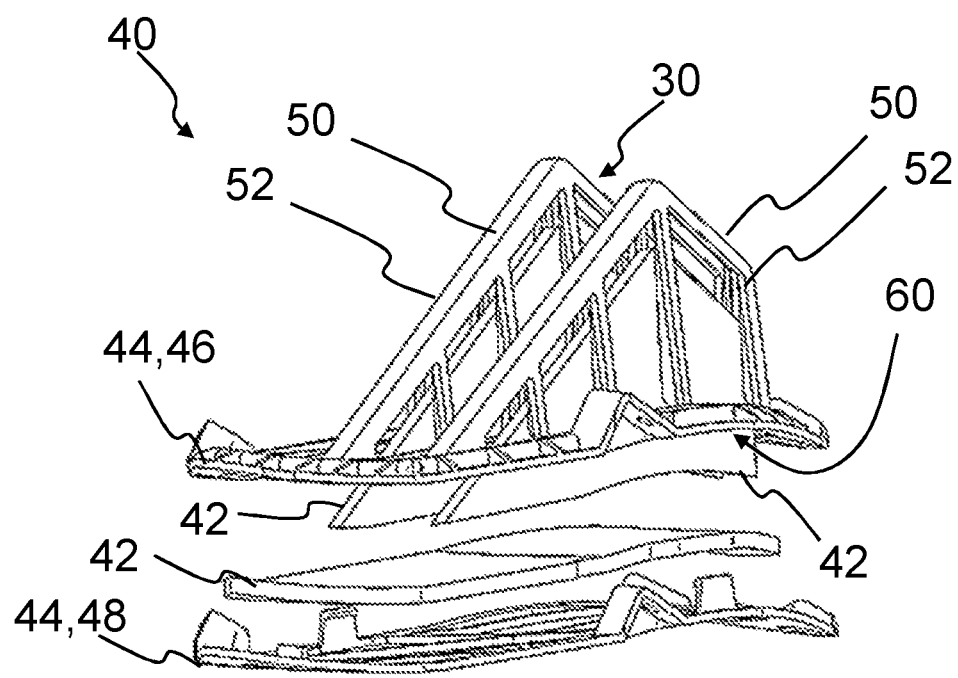
FIG. 4 shows in exploded illustration components of the adsorber element according to FIG. 1.

FIG. 1 shows a perspective view of the adsorber element 40. FIG. 2 shows a side view of the adsorber element 40. FIG. 3 shows in exploded illustration components of the adsorber element 40, and FIG. 4 shows in exploded illustration components of the adsorber element 40 in almost assembled state.

The adsorber element 40 comprises a frame 30 with a base plate 44 and one or a plurality of, in this example two, rigid support elements 50 projecting away from the base plate 44 and embodied sail-like. The support elements 50 are arranged rigidly on the base plate 44. The base plate 44 and the support elements 50 each comprise adsorber medium 42. The adsorber medium 42 is expediently provided in a mat form.

The base plate 44 is embodied grid-shaped so that fluid that passes alongside the base plate 44 can reach the adsorber medium 42 through openings 54, of which some are identified with reference characters. In this example, the base plate 44 comprises a top plate 46 and a bottom plate 48 between which the adsorber medium 42 is arranged. The bottom plate 48 is also embodied grid-shaped so that fluid that passes alongside the backside of the base plate 44 can also reach the adsorber medium 42. The efficiency of the adsorber surface as well as the inflow surface of the base plate 44 are thus doubled.

The two support elements 50 support the adsorber medium 42 of the respective support element 50 at least at one side. In the illustrated embodiment, the two support elements 50 are designed in the form of a pocket 52 into which the adsorber material 42 can be inserted. This can be seen in the FIGS. 3 and 4.

The two pocket-like support elements 50 project rigidly away from the top plate 46 of the base plate 44 into which a mat-shaped adsorber element 42 can be inserted, respectively. The top plate 46 of the base plate 44 and the support elements 50 are embodied as one piece, for example. The bottom plate 48 of the base plate 44 can be fastened to the top plate 46 and, for example, can be fixedly clipped, screwed, glued, fused thereto.

Between the two plates 46, 48 of the base plate 44, a mat-shaped adsorber element 42 is inserted and clamped fixedly by the connected plates 46, 48. The base plate 44 and the support elements 50 comprises closed rims so that the adsorber media 42 in the support elements 50 and the base plate 44 are sealed at the rim and no adsorption material can escape from the adsorber element 40.

The base plate 44 is slightly curved and can be adapted easily to an installation situation in an air filter housing or the like.

The base plate 44 can be covered optionally at its side 58 which is oppositely positioned to the support elements 50 by a fluid-tight cover (not illustrated). This permits an improved transportation capability of the base plate 44 so that the adsorber element 40 can be produced at a different location than the air filter system and can then be installed in the latter.

Figure 5:
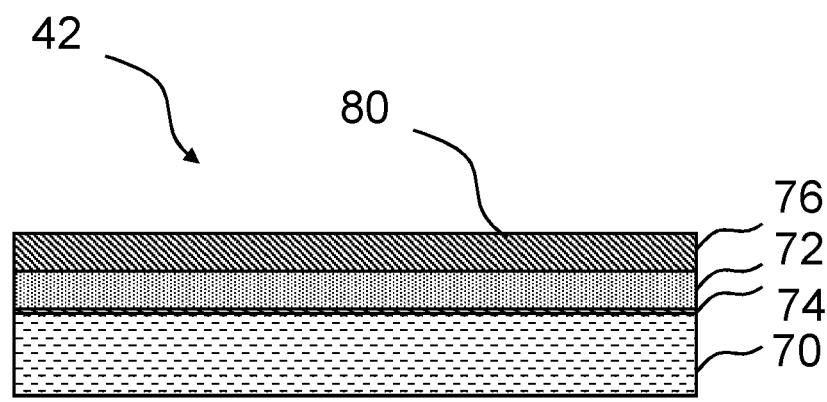
FIG. 5 shows a section view of an adsorber medium according to an embodiment of the invention.

FIG. 5 shows a section illustration of an adsorber medium 42 according to an embodiment of the invention. The adsorber medium 42 is embodied, for example, as a single activated carbon layer 80. The adsorber medium 42 can also be comprised of a plurality of such layers 80.

In the illustrated embodiment, an adsorbent layer 72, in particular an activated carbon layer 72, is arranged on a gas-permeable carrier layer 70. The activated carbon layer 72 is secured in this context by an adhesive layer 74 on the carrier layer 70. The activated carbon layer 72 is covered by a gas-permeable holding layer 76.

Preferably, the adsorbent layer 72 is laid onto the carrier layer 70. In this way, it can be ensured that this layer 72 ensures a high fluid permeability. The efficiency can be controlled by type and quantity of the adsorbent.

The carrier layer 70 can be comprised, for example, of one or a plurality of flat layers of polyethylene terephthalate (PET). The flat layer can be stamped out. The adsorbent layer 72 can also be applied in several layers onto the carrier layer 70.

Figure 6:
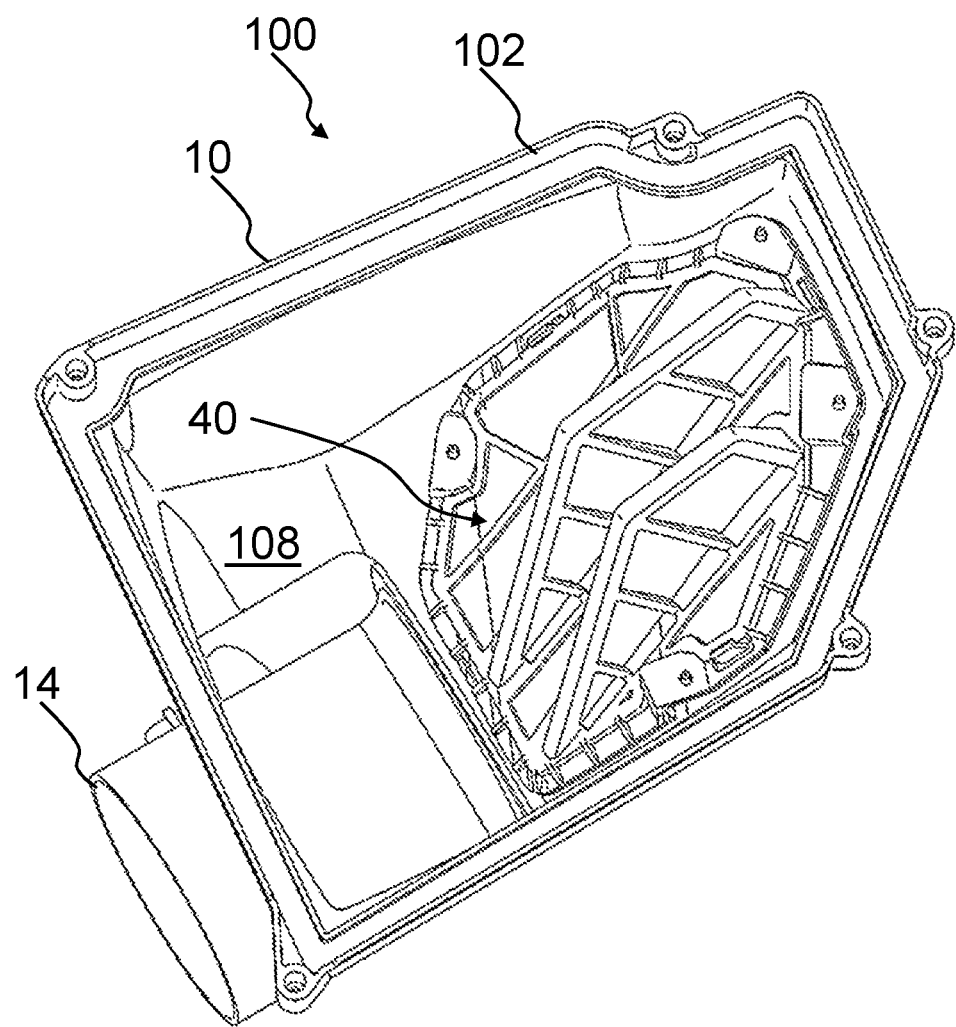
FIG. 6 shows a plan view of a clean air hood of an air filter with an adsorber element installed in the clean air hood.
Figure 7:
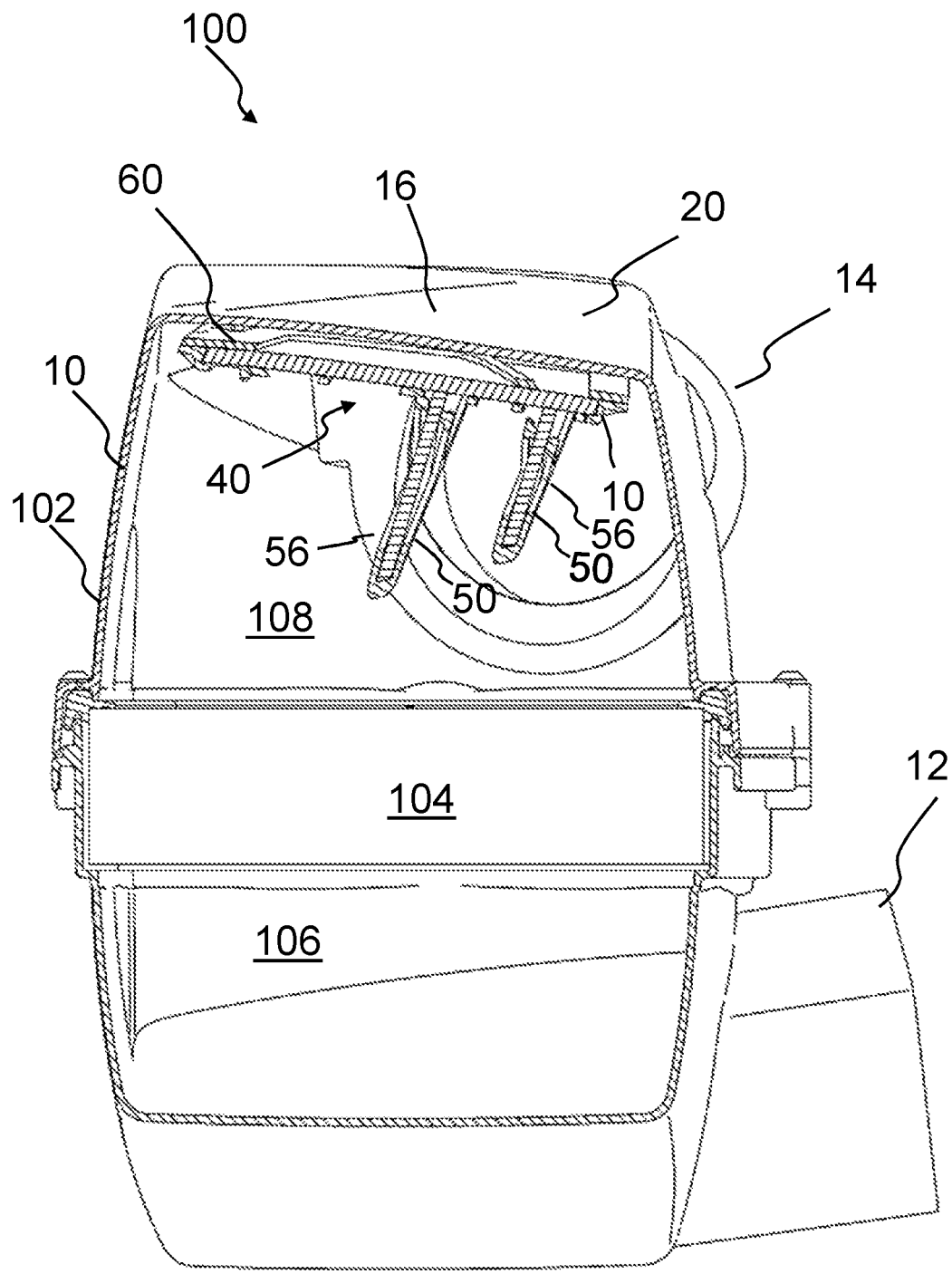
FIG. 7 shows a section through a filter system with filter element and adsorber element according to an embodiment of the invention.

FIG. 6 shows a plan view of a clean air hood 102 of an air filter system 100 with the adsorber element 40, as it is described in the preceding embodiment, installed in the clean air hood 102. FIG. 7 shows a section of the filter system 100 with a filter element 104 and an adsorber element 40 according to an embodiment of the invention. The adsorber element 40 is fastened, for example, non-detachably welded, in the housing 10 with tabs at the rim of the base plate 44.

The filter system 100 comprises a housing 10 with an inlet 12 and an outlet 14 and can be flowed through by a gaseous fluid from the inlet 12 to the outlet 14. The filter element 104 is arranged between raw side 106 and clean side 108. The fluid flow, for example, air, flows in FIG. 7 laterally into the housing 10 and upwardly through the filter element 104 to the outlet 14 which is arranged, in turn, laterally at the housing 10.

The base plate 44 of the adsorber element 40 is substantially arranged parallel to a region 16 of an outer wall 20 of the housing 10 and projects with the rigid support elements 50 into the clean side 108. The support elements 50 are arranged with their adsorber surface 56 substantially parallel to the main flow direction between outflow side of the filter element 104 and the outlet 14 of the housing 10 so that no noteworthy effect on the flow occurs in operation. Furthermore, the support elements 50 and the adsorber element 40 as a whole cause no noteworthy pressure loss.

Therefore, an operation of a possibly present air-mass meter, as it is usually arranged at the outlet 14, is essentially not affected. For various embodiments of the air filter system 100, the air-mass meter can be used cost-efficiently with unchanged calibration.

The depth with which the support elements 50 project into the clean side 108, their position and their number can be adapted easily to existing boundary conditions of the filter system 100.

The base plate 44 can be arranged at a distance from the region 16 of the outer wall 20, for example, by means of spacers. Then, the fluid can also flow between base plate 44 and the region 16 of the housing 10 behind the base plate 44 and can come into contact with the backside of the adsorber medium 42 of the base plate 44.

What is claimed is:

1. An adsorber element for a filter system, wherein the filter system comprises a housing with an inlet and an outlet and is configured to be flowed through by a gaseous fluid from the inlet to the outlet, wherein the adsorber element comprises:
   a frame comprising a base plate and one or more rigid support elements projecting away from the base plate;
   an adsorber medium disposed at the frame and arranged at least in sections of the base plate and at least in sections of the one or more rigid support elements.

2. The adsorber element according to claim 1, wherein the base plate comprises openings.

3. The adsorber element according to claim 2, wherein a portion of the adsorber medium arranged at the base plate is arranged on a side of the base plate that is oppositely positioned to the one or more support elements.

4. The adsorber element according to claim 1, wherein the one or more rigid support elements are configured to support a portion of the adsorber medium arranged at the one or more rigid support elements at least at one side of said portion of the adsorber medium.

5. The adsorber element according to claim 4, wherein the one or more rigid support elements comprise a pocket configured to hold said portion of the adsorber medium.

6. The adsorber element according to claim 1, wherein the adsorber medium comprises at least one activated carbon-containing layer, wherein the at least one activated carbon-containing layer comprises a gas-permeable carrier layer and an activated carbon layer arranged on the gas-permeable carrier layer.

7. The adsorber element according to claim 6, wherein the adsorber medium further comprises a gas-permeable holding layer that covers the activated carbon layer.

8. The adsorber element according to claim 1, wherein the one or more rigid support elements and the base plate each comprise sealed rims.

9. A filter system comprising:
   a housing comprising an inlet and an outlet and configured to be flowed through by a gaseous fluid from the inlet to the outlet;
   a filter element arranged in the housing between the inlet and the outlet;
   at least one adsorber element comprising:
      a frame comprising a base plate and one or more rigid support elements projecting away from the base plate;
      an adsorber medium disposed at the frame and comprising (i) at least a first section arranged in the base plate, and (ii) at least a second section arranged in the one or more rigid support elements, the at least second section separable from the at least first section.

10. The filter system according to claim 9, wherein the base plate of the at least one adsorber element is arranged parallel to a region of an outer wall of the housing.

11. The filter system according to claim 9, wherein the base plate of the at least one adsorber element is arranged at a slant to a region of an outer wall of the housing.

12. The filter system according to claim 9, wherein the base plate of the at least one adsorber element is arranged at a distance from a region of an outer wall of the housing.

13. The filter system according to claim 9, wherein an adsorber surface of the one or more rigid support elements is arranged parallel to a main flow direction between an outflow side of the filter element and the outlet of the housing.

14. The filter system according to claim 9, wherein the at least one adsorber element is arranged downstream of the filter element.

15. The filter system according to claim 9, wherein the at least one adsorber element is arranged in a clean air region of the housing.

* * * * *